United States Patent Office 3,189,633
Patented June 15, 1965

3,189,633
2,6,7-TRIOXA-1-PHOSPHABICYCLO[2.2.2]OCTANE SULFO-OXO, AND SELENO DERIVATIVES AND PROCESS FOR MAKING SAME
Wen-Hsuan Chang, Pittsburgh, and Marco Wismer, Richland Township, Gibsonia, Pa., assignors to Pittsburgh Plate Glass Company, Pittsburgh, Pa., a corporation of Pennsylvania
No Drawing. Filed Sept. 20, 1960, Ser. No. 57,125
9 Claims. (Cl. 260—461)

This invention relates to novel cyclic oxygen containing organic compounds of phosphorus and it has particular relation to novel 4-organic radical-substituted-2,6,7-trioxa-1-phosphabicyclo[2.2.2]octane and to its sulfo, oxo and seleno derivatives.

It has been suggested to react phosphorus oxychloride with a nitro compound; namely, nitro-isobutyl-glycerin, to form a bicyclic nitro compound such as that represented by the formula:

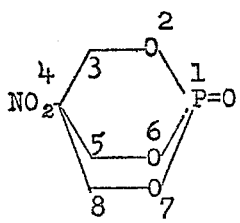

The latter may be termed 4-nitro-1-oxo-2,6,7-trioxa-1-phosphabicyclo[2.2.2]octane.

This invention is based upon the discovery that the presence of the nitro group in the trimethylol compound in the foregoing reaction is not essential, but on the contrary, a series of novel reactions may be effected to provide novel and useful products by the reaction of a compound containing a trimethylol substituted carbon atom with an appropriately trihalo substituted phosphorus compound.

In accordance with one phase of the invention, a compound containing a trimethylol substituted carbon atom which is free of nitro groups may be reacted with phosphorus trichloride or other trihalides of phosphorus.

The reaction may be represented by the formula:

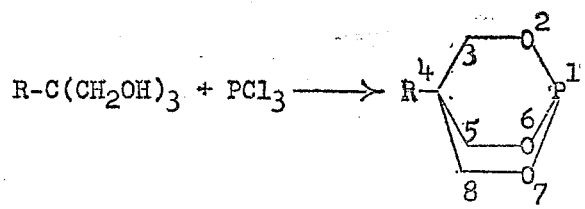

wherein R is a radical, e.g., ethyl, methyl, propyl, allyl, methallyl, butyl, benzyl, phenyl, chlorophenoxymethyl, bromophenoxymethyl, and other groups may also be included. It will be apparent that in the reaction, hydrogen chloride is also evolved, but is usually bound by a base such as pyridine, collidine, triethylamine, or other tertiary amines.

The reaction product as obtained by the foregoing reaction may be termed 4-organic radical-substituted-2,6,7-trioxa-1-phosphabicyclo[2.2.2]octane.

In a further phase of the invention, it has been found that a compound containing a trimethylol substituted carbon atom can be reacted with phosphorus oxychloride to form 1-oxo derivatives, in accordance with the equation:

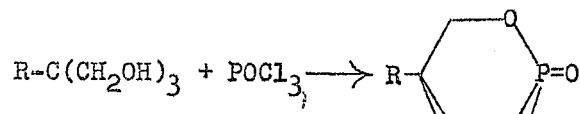

wherein R has the significance previously given. The compound obtained in this reaction may be termed 4-substituted-1-oxo-2,6,7-trioxa-1-phosphabicyclo[2.2.2]octane. $POCl_3$ may be replaced by $PSeCl_3$ or $PSCl_3$ to give the corresponding seleno or sulfo derivatives.

As a further feature of the invention, the 4-substituted-2,6,7-trioxa-1-phosphabicyclo[2.2.2]octanes of the first reaction may be converted by oxidation into 4-substituted-1-oxo-2,6,7-trioxa-1-phosphabicyclo[2.2.2]octane of the second reaction, or into seleno or sulfo compounds wherein the exocyclic oxygen on the phosphorus atom is substituted by an atom of sulfur or selenium.

In the reactions as above described, various trimethylol methanes containing a group such as alkane, alkene, phenyl, phenoxy, halophenoxymethyl group directly attached to the carbon atom to which the methylol groups are attached, may be used, but two of the more common compounds of the class comprise trimethylolpropane of the formula: $CH_3CH_2C(CH_2OH)_3$, and trimethylolethane of the formula: $CH_3C(CH_2OH)_3$. All contain three methylol groups attached to a single carbon atom.

The reaction of trimethylolpropane with phosphorus trichloride to form 4-ethyl-2,6,7-trioxa-1-phosphabicyclo-[2.2.2]octane is illustrated in the following example:

EXAMPLE I

The apparatus comprised a 2-liter flask equipped with a stirrer, a thermometer and a water condenser.

The charge was made up comprising 134 grams (1 mole) of trimethylolpropane dissolved in 316.4 grams (4 moles) of pyridine as a hydrogen chloride acceptor. This mixture was heated slightly in order to obtain homogeneity, and was further diluted with 300 milliliters of absolute ether.

The foregoing mixture was brought to a temperature of 23° C. to 26° C. and a solution of 100 milliliters of absolute ether and 137 grams (1.5 moles) of phosphorus trichloride was added dropwise. Toward the end of the addition, the reaction mixture became viscous and in order to improve stirring, 350 milliliters of absolute ether was added. Stirring was then continued at room temperature overnight.

The following day, the product was filtered in the absence of moisture to obtain a filter cake and a first filtrate. The filtrate was evaporated to dryness in vacuum and was then distilled. A 39-gram yield of a fraction boiling in the range of 112° C. to 119° C. at 7.3 to 8 milliliters of pressure (absolute) and melting in a range of 51° C. to 55° C. was obtained.

The cake from the first filtration was extracted with 750 milliliters of analytical grade of normal butyl alcohol, and the second filtrate thus obtained was distilled at a pressure of 10 millimeters of mercury to remove butanol. When most of the butanol was removed, the product started to crystallize. At this point, the vacuum was discontinued and 400 milliliters of ether was added to extract out the product, and the mixture was then again filtered. The resultant third filtrate was evaporated to dryness and was distilled. A fraction weighing 56.6 grams, that boiled at 115° C. to 119° C. at 10.2 to 9.7 millimeters of mercury, was collected as a part of the product. The total yield, including the 39 grams from the first filtrate, was 85.6 grams.

The material that boiled in the range of 110° C. at 8 millimeters of mercury and at 93° C. at a pressure of 3.5 millimeters of mercury, and having melting points of 45° C. to 52° C. was analyzed. The theoretical analysis based upon the empirical formula $C_6H_{11}PO_3$ was:

C _____ 44.44
H _____ 6.84
P _____ 19.11

The analytically determined analyses for two samples were:

|   | Sample 1 | | Sample 2 | |
|---|---|---|---|---|
| C | 43.31 | 43.53 | 43.45 | 43.48 |
| H | 7.12 | 7.36 | 7.41 | 7.25 |
| P |  |  | 18.53 | 18.79 |

The product was 4-ethyl-2,6,7-trioxa-1-phosphabicyclo[2.2.2]octane.

EXAMPLE II

In accordance with this example, 4-ethyl-1-oxo-2,6,7-trioxa-1-phosphabicyclo[2.2.2]octane was prepared by the reaction of phosphoryl chloride and trimethylolpropane. In the reaction, a 2-liter flask equipped with a stirrer, water condenser and such like equipment was used as a reaction vessel. Into this vessel was introduced a charge comprising 67 grams (0.5 mole) of trimethylolpropane and 158.8 grams of pyridine as a hydrogen chloride acceptor. The mixture was warmed slightly in order to obtain a solution, and to the solution was further added 50 milliliters of petroleum ether. The mixture was warmed to a temperature of 43° C. to 50° C. and a mixture of 80.33 grams (0.525 mole) of phosphoryl chloride ($POCl_3$) and 50 milliliters of petroleum ether was added dropwise.

The resultant reaction was exothermic and the heat was removed by external cooling. As the phosphoryl chloride was added, solid precipitated, rendering stirring difficult. At this point, another 200 milliliters of petroleum ether were added and the mixture was then stirred for 6 hours at room temperature, and further kept at room temperature overnight to insure completion of the reaction.

The following day, 50 milliliters of water were added to the mixture to dissolve the pyridine hydrochloride formed. The mixture was filtered and a first yield of 540 grams of a product having a melting point of 203° C. to 208° C. was obtained.

The filtrate was neutralized with a water solution of 60 grams (1.5 moles) of sodium hydroxide. The neutralized product was concentrated under vacuum and the residue was extracted with 250 milliliters of boiling normal butanol.

Seventy-five (75) grams of sodium chloride were filtered off and the filtrate was evaporated to dryness to obtain 19.5 grams of additional product melting in a range of 202° C. to 208° C.

A total yield of 73.5 grams of the desired product was obtained and was recrystallized from boiling water, the crystalline product being of a melting point of 202° C. to 203° C. This product had an infrared spectrum which was identical to that obtained from the product resulting from the oxidation of 4-ethyl-2,6,7-trioxa-1-phosphabicyclo[2.2.2]octane of Example I, in the manner hereinafter to be described. The product was also analyzed, the theoretical analysis being upon the basis of empirical formula $C_6H_{11}PO_4$, which gives the values:

C _____ 40.46
H _____ 6.23
P _____ 17.39

The data of the actual analyses upon the sample are as follows:

| | | |
|---|---|---|
| C | 41.16 | 41.44 |
| H | 6.40 | 6.76 |

The product was 4-ethyl-1-oxo-2,6,7-trioxa-1-phosphabicyclo[2.2.2]octane.

EXAMPLE III

In this example, 4-ethyl-1-oxo-2,6,7-trioxa-1-phosphabicyclo[2.2.2]octane was prepared by oxidation with ozone of the 4-ethyl-2,6,7-trioxa-1-phosphabicyclo[2.2.2]octane as prepared by Example I. In the reaction, 10 grams of the product of Example I were dissolved in a mixture of 20 milliliters of carbon tetrachloride and 20 milliliters of hexane. Upon bubbling ozone through a tube into the solution at room temperature, a crystalline solid began to form instantaneously, the tube being obstructed by the precipitated product. Complete oxidation was accomplished by delivering the ozone gas above the liquid while stirring the latter.

A yield of 7 grams of solid product having a melting point of 200° C. to 207° C., and 3 grams of a solid having a melting point of 180° C. to 200° C. was obtained. The product was twice recrystallized from boiling water and was then further crystallized from acetone to give a product melting in a range of 207° C. to 208° C. The empirical formula of this product was assumed to be $C_6H_{11}PO_4$. The theoretical analysis of this product was:

C _____ 40.46
H _____ 6.23
P _____ 17.39

The analytically determined analyses of the sample were as follows:

| | | |
|---|---|---|
| C | 40.23 | 40.18 |
| H | 6.39 | 6.45 |
| P | 17.44 | 17.58 |

The material substantially corresponded to that of Example II.

EXAMPLE IV

In accordance with this example, 4-methyl-1-oxo-2,6,7-trioxa-1-phosphabicyclo[2.2.2]octane was prepared by the reaction of trimethylolethane and phosphoryl chloride, the techniques being substantially the same as those described in Example II, except that trimethylolethane was used in place of the trimethylolpropane of the former example.

In this reaction, a 2-liter flask equipped with a stirrer and a water condenser was again employed as a reaction vessel. To the flask were added 30 grams (0.25 mole) of trimethylolethane and 159.2 grams (2 moles) of pyridine as a hydrogen chloride acceptor. The mixture was slightly warmed to dissolve the solid and was then mixed with 200 milliliters of dry petroleum ether. To the mixture in the flask at a temperature of 25° C. to 38° C., a mixture of 40.2 grams (0.263 mole) of phosphorus oxychloride ($POCl_3$) and 100 milliliters of dry petroleum ether was added dropwise. An exothermic reaction occurred and when this was terminated, the reaction mixture was stirred at room temperature for 2.5 hours and was kept at room temperature overnight.

To the reaction mixture were added 50 milliliters of water and 7 grams of solid product were filtered off. The filtrate solution was concentrated in vacuum and a solution of 30 grams (0.75 mole) of sodium hydroxide dissolved in 200 milliliters of water was added with cooling. The solution was again concentrated and the resultant slurry was thrice extracted with hot acetone. A solid residue, mainly sodium chloride (43 grams), remained.

The acetone solution was concentrated in vacuum to a volume of 50 milliliters and 25 milliliters of normal butanol were incorporated. The solution was again concentrated to 50 milliliters volume and after cooling, 18.5 grams of a crystalline product having a melting range of 244.5° C. to 249° C. were obtained by filtration. Upon further evaporation of the solution, 4.5 grams of additional solid were obtained, the total yield being 7+18.5+4.5=30 grams.

The combined product was recrystallized three times from acetone to give a product melting in a range of 245° C. to 247° C. The empirical formula for this product was assumed to be $C_5H_9PO_4$ having the theoretical analysis:

C _____ 36.59
H _____ 5.53
P _____ 18.88

The formula was confirmed by analytically determined analyses of the sample, the data of which are:

| | | |
|---|---|---|
| C | 36.77 | 36.53 |
| H | 5.98 | 6.02 |
| P | 18.82 | 18.58 |

EXAMPLE V

In this example, 4-ethyl-1-seleno-2,6,7-trioxa-1-phosphabicyclo[2.2.2]octane was prepared by the reaction of selenium and 4-ethyl-2,6,7-trioxa-1-phosphabicyclo[2.2.2]octane prepared by the method of Example I. In the reaction, 10 grams of the product of Example I were mixed with 3 grams of selenium and 50 grams of benzene. The mixture was stirred and refluxed for 1 hour. Since apparently little reaction occurred, 0.01 gram of sodium selenide was added as a catalyst to the refluxing solution. The selenium dispersion suddenly coagulated and the solution became transparent and colorless. This mixture was stirred and refluxed for another 2 hours and was kept at room temperature overnight. Some crystals had formed and were redissolved by heating the mixture. The selenium not reacted was removed by filtration.

The filtrate was concentrated and solid crystals which melted at 172° C. to 194° C. precipitated. The crystals were twice recrystallized from monomethyl ether of ethylene glycol, whereby to obtain 3.6 grams of a product melting at 207° C. to 210° C. The empirical formula of the material was assumed to be $C_6H_{11}PSeO_3$. The theoretical analysis on the basis of this formula is:

C _____ 29.89
H _____ 4.60
P _____ 12.85

The formula was confirmed by analyses upon the sample, the data of which are as follows:

| | | |
|---|---|---|
| C | 30.56 | 30.76 |
| H | 4.76 | 4.80 |
| P | 12.75 | 12.58 |

EXAMPLE VI

In accordance with this example, 4-ethyl-1-thio-2,6,7-trioxa-1-phosphabicyclo[2.2.2]octane was prepared by the reaction of phosphorus thiochloride and trimethylolpropane in the presence of pyridine as a hydrogen chloride acceptor. The reaction vessel was again a 2-liter round bottom flask equipped with a stirrer, a thermometer and a water condenser. The charge comprised 33.5 grams (0.25 mole) of trimethylolpropane and 158.2 grams (2.0 moles) of pyridine. The mixture was warmed to dissolve the solid and 200 milliliters of petroleum ether were added, then a mixture of 44.5 grams (0.2625 mole) of phosphorus thiochloride and 100 milliliters of petroleum ether was added dropwise at a temperature in a range of 23° C. to 38° C. When addition was complete, the mixture was stirred for 2.5 hours and was then kept at room temperature overnight. Then 50 milliliters of water were added to dissolve the pyridine hydrochloride formed. Thirty (30) grams of product were filtered from the aqueous solution and gave a melting point of 178° C. to 179° C.

The aqueous solution was treated with 30 grams of a solution of sodium hydroxide in 200 milliliters of water. The resultant solution was evaporated to dryness and was extracted with methanol to obtain 9 grams of a product having a melting point of 169° C. to 175° C. The total yield of the product was 39 grams.

This product was crystallized three times from a butanol-acetone mixture to further purify it, thus producing a material having a melting point of 175° C. to 178° C. The theoretical value for the analysis of this product upon the basis of the empirical formula $C_6H_{11}PSO_3$ is:

C _____ 37.11
H _____ 5.71
P _____ 15.95
S _____ 16.48

The analyses as experimentally determined on the sample confirmed the formula as follows:

| | | |
|---|---|---|
| C | 37.07 | 36.92 |
| H | 5.88 | 5.70 |
| P | 15.86 | 15.76 |
| S | 16.51 | 16.35 |

EXAMPLE VII

In this example, 4-methyl-1-thio-2,6,7-trioxa-1-phosphabicyclo[2.2.2]octane was prepared by the reaction of trimethylolethane and phosphorus thiochloride. In the reaction, a charge comprising 44.51 grams (0.2625 mole) of phosphorus thiochloride dissolved in 100 milliliters of dry petroleum ether was added dropwise at a temperature of 23° C. to 26° C. to a solution of 30.0 grams of trimethylolethane and 158.2 grams of pyridine, as in Example IV. The reaction mixture was stirred at room temperature for 4 hours and then was allowed to stand overnight. To the product were added 50 milliliters of water to dissolve pyridine hydrochloride. The insoluble phase formed a solid lump and the aqueous filtrate was incorporated with a cold solution of 30 grams (0.75 mole) of sodium hydroxide in 200 milliliters of water, and the solution was then concentrated under vacuum. The resultant concentrate was extracted repeatedly with hot butanol and the extract solution, when evaporated to dryness, gave a yield of 24.5 grams of product. The product was purified by crystallization from an acetone-butanol mixture and melted at 223° C. to 226° C. The analysis of the product upon the basis of the empirical formula $C_5H_9PSO_3$ is:

C _____ 33.33
H _____ 5.04
P _____ 17.19
S _____ 17.80

The composition of the material was confirmed analytically by analyses upon the sample, the data of which are:

| | | |
|---|---|---|
| C | 33.14 | 33.32 |
| H | 5.47 | 5.62 |
| P | 16.81 | 16.93 |
| S | 17.96 | 18.05 |

In like manner, phenoxy and halo substituted phenoxy substituted trimethylolethanes of the general formula:

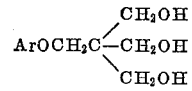

wherein Ar is a simple phenyl group, or a phenyl group wherein 1 to 5 hydrogen atoms are replaced by chlorine or bromine, may be reacted with phosphorus trichloride or with a compound of the formula: $XPCl_3$, wherein X is oxygen, sulfur or selenium, to provide other 4-substituted-1-oxo-, or -1-thio- or -1-seleno-2,6,7-trioxa-1-phosphabicyclo[2.2.2]octanes. Monopentachlorophenyl pentaerythritol ether has been reacted with phosphorus oxychloride to form 4-pentachlorophenoxymethyl-1-oxo-2,6,7-trioxa-1-phosphabicyclo[2.2.2]octane.

Similarly, monopentachlorophenyl pentaerythritol ether has been reached with phosphorus thiochloride to provide 4 - pentachlorophenoxymethyl-1-thio-2,6,7-trioxa-1-phosphabicyclo[2.2.2]octane.

Also, monopentabromophenyl pentaerythritol ether has been reacted with phosphorus thiochloride to form 4-pentabromophenoxymethyl - 1 - thio-2,6,7,-trioxa-1-phosphabicyclo[2.2.2]octane.

Another class of compounds which has been prepared has the general formula:

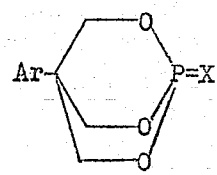

wherein Ar and X have the significance previously given. Examples of these compounds are 4-phenyl-1-thio-2,6,7-trioxa - 1 - phosphabicyclo[2.2.2]octane and 4-phenyl-1-oxo-2,6,7,-trioxa-1-phosphabicyclo[2.2.2]octane.

In the foregoing compounds, the group Ar may be replaced by an allyl group or a methallyl group.

The materials of the foregoing examples have various uses, as for instance, in medicine and as fire retardant agents in the preparation of various resins. The following is illustrative of the latter use.

EXAMPLE VIII

A polyester was prepared comprising:

| | Moles |
|---|---|
| Phthalic anhydride | 3 |
| Maleic anhydride | 2 |
| Propylene glycol | 4.1 |
| Diethylene glycol | 1.4 |

The mixture was heated to form a polyester in conventional manner.

Test A

For purposes of determining the effect of bicyclic phosphorus compounds herein disclosed as fire retardant agents, a sample was made up comprising:

| | Grams |
|---|---|
| Polyester | 50 |
| 4 - ethyl-1-thio-2,6,7-trioxa-1-phosphabicyclo[2.2.2]octane | 12.5 |

The two components were mixed at a temperature of 100° C. and the mixture was agitated while the temperature was raised to a range of 110° C. to 125° C., thus forming a clear solution. In order to conduct a fire retardancy test, the mixture was diluted with 20 percent by weight based upon the total mixture of styrene. The resultant mixture was heated to a temperature of 120° F. and 1 percent by weight based upon the mixture, of benzoyl peroxide was added, and test castings were cured at 170° F. for 1 hour, followed by a baking period of 1 hour at 250° F. The castings, when subjected to the test of ASTM D635–44, were found to be self-extinguishing. Similar castings from which the 4-ethyl-1-thio-2,6,7-trioxa-1-phosphabicyclo[2.2.2]octane was omitted, were not self-extinguishing and would continue to burn when ignited until consumed.

Test B

In a second test conducted in similar manner with 4-ethyl - 1-oxo-2,6,7-trioxa-1-phosphabicyclo[2.2.2]octane, the same polyester was employed. A mixture was prepared comprising:

| | Grams |
|---|---|
| Polyester | 300 |
| Bicyclo-octane compound | 75 |

In order to form the mixture, the polyester was heated to 100° C. and the bicyclo-octane compound was added with agitation. Heating and agitating were continued until a temperature of 145° C. was reached. This mixture was then further diluted with 20 percent by weight based upon the total mixture of styrene and castings were prepared as above described. The castings were also cured in accordance with the preceeding schedule and were subjected to a flame retardancy test in accordance with ASTM D635–44. The test castings were found to be self-extinguishing. The material had valuable flame retardant properties.

We claim:

1. A compound having the formula

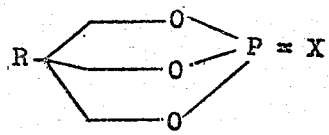

wherein R is a group selected from the class consisting of phenyl and benzyl and X is a group selected from the class consisting of oxygen, selenium, and sulfur.

2. A compound of the formula

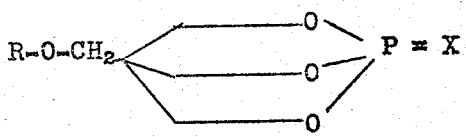

wherein R is a group selected from the class consisting of phenyl and halophenyl and X is a group selected from the class consisting of oxygen, selenium, and sulfur.

3. 4-phenyl - 1 - thio - 2,6,7 - trioxa-1-phosphabicyclo[2.2.2]octane.

4. 4-phenyl - 1 - oxo - 2,6,7-trioxa-1-phosphabicyclo[2.2.2]octane.

5. 4-pentachlorophenoxymethyl - 1 - oxo-2,6,7-trioxa-1-phosphabicyclo[2.2.2]octane.

6. 4-pentachlorophenoxymethyl - 1 - thio-2,6,7-trioxa-1-phosphabicyclo[2.2.2]octane.

7. 4-pentabromophenoxymethyl - 1 - thio-2,6,7-trioxa-1-phosphabicyclo[2.2.2]octane.

8. The method of forming a compound of the formula

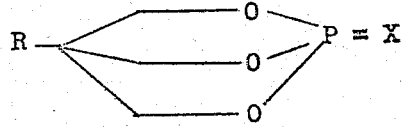

wherein R is a group selected from the class consisting of phenyl and benzyl and X is a group selected from the class consisting of oxygen, selenium, and sulfur, which comprises subjecting to reaction a compound of the formula: $XP(Cl)_3$, wherein X is of the above-indicated significance, and a compound of the formula:

$R—C(CH_2OH)_3$ wherein R has the previously given significance.

9. The method of forming a compound of the formula:

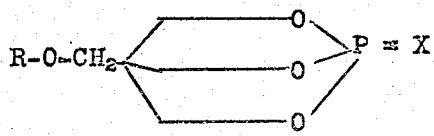

wherein R is an aryl group and X is a group selected from the class consisting of oxygen, selenium, and sulfur, which comprises subjecting to reaction a compound of the formula: $XP(Cl)_3$, wherein X is of the above-indicated significance, and a compound of the formula: $R-C(CH_2OH)_3$, wherein R is a group selected from the class consisting of phenyl and halophenyl.

References Cited by the Examiner

UNITED STATES PATENTS

| | | | |
|---|---|---|---|
| 2,643,261 | 6/53 | Matuszak et al. | 260—461 |
| 2,894,016 | 7/59 | Lanham | 260—461 |
| 2,894,974 | 7/59 | Lanham | 260—461 |
| 2,903,474 | 9/59 | Lanham | 260—461 |
| 3,000,850 | 9/61 | Ainsworth | 260—461 X |
| 3,033,887 | 5/62 | Wadsworth et al. | 260—461 |
| 3,033,888 | 5/62 | Wadsworth et al. | 260—461 |
| 3,038,001 | 6/62 | Wadsworth et al. | 260—461 |

OTHER REFERENCES

Carre: Bull. Soc. Chim. 27(3), 261–269 (1902).

CHARLES B. PARKER, *Primary Examiner.*

ABRAHAM H. WINKELSTEIN, MORRIS LIEBMAN, IRVING MARCUS, JOSEPH P. BRUST, *Examiners.*